United States Patent
Xu et al.

(10) Patent No.: US 12,096,473 B2
(45) Date of Patent: Sep. 17, 2024

(54) SYSTEMS AND METHODS FOR CHANNEL ACCESS

(71) Applicant: ZTE CORPORATION, Guangdong (CN)

(72) Inventors: Hanqing Xu, Shenzhen (CN); Yajun Zhao, Shenzhen (CN); Xincai Li, Shenzhen (CN); Ling Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/500,641

(22) Filed: Nov. 2, 2023

(65) Prior Publication Data

US 2024/0064807 A1 Feb. 22, 2024

Related U.S. Application Data

(63) Continuation of application No. 17/149,500, filed on Jan. 14, 2021, now Pat. No. 11,832,303, which is a continuation of application No. PCT/CN2018/096394, filed on Jul. 20, 2018.

(51) Int. Cl.
*H04W 16/14* (2009.01)
*H04W 74/0808* (2024.01)

(52) U.S. Cl.
CPC ....... *H04W 74/0808* (2013.01); *H04W 16/14* (2013.01)

(58) Field of Classification Search
CPC ..................................................... H04W 16/04
USPC ......................................................... 370/329
See application file for complete search history.

(56) References Cited

U.S. PATENT DOCUMENTS

| 2015/0189627 A1 | 7/2015 | Yang et al. |
| 2016/0095114 A1 | 3/2016 | Kim et al. |
| 2016/0338053 A1 | 11/2016 | Park et al. |

FOREIGN PATENT DOCUMENTS

| CN | 107079464 A | 8/2017 |
| EP | 3 373 484 A1 | 9/2018 |
| KR | 20170128107 A | 11/2017 |
| WO | WO-2017/107298 A1 | 6/2017 |
| WO | WO-2017/111857 A1 | 6/2017 |

OTHER PUBLICATIONS

CATT: "Channel Access Procedures for NR Unlicensed Operations" 3GPP TSG RAN WG1 Meeting #93 R1-1806317, May 25, 2018 (4 pages).
CATT: "Channel Access Procedures for NR Unlicensed Operations" 3GPP TSG RAN WG1 Meeting #93; R1-1806317; May 25, 2018; Busan, Korea (4 pages).
Communication pursuant to Article 94(3) EPC on EP Appl. No. 18926672.9, dated Mar. 17, 2023 (8 pages).

(Continued)

*Primary Examiner* — Angel T Brockman
(74) *Attorney, Agent, or Firm* — Foley & Lardner LLP

(57) ABSTRACT

A system and method for channel access in licensed and unlicensed spectrums are disclosed herein. In one embodiment, a method performed by a communication node, includes: detection of an idle channel associated with a communication device after performance of a channel access procedure; transmitting an initial signal after the detection of the idle channel, wherein the initial signal configures a communication device to start detecting a control channel; and transmitting a control signal using the control channel to the communication device after the transmitting the initial signal.

20 Claims, 3 Drawing Sheets

(56) References Cited

OTHER PUBLICATIONS

Extended European Search Report for EP Appl. No. 18926672.9, dated Jun. 30, 2021 (10 pages).
First Office Action for CN Appl. No. 2018800958002, dated Jul. 29, 2022 (with English translation, 19 pages).
First Office Action for IN Appl. No. 202127002073, dated Oct. 31, 2022 (5 pages).
First Office Action for KR Appl. No. 10-2021-7005087, dated Dec. 21, 2022 (with English translation, 8 pages).
International Search Report and Written Opinion for PCT Appl. No. PCT/CN2018/096394 mailed Apr. 19, 2019 (6 pages).
Nokia et al., "On DL Signals and Channels for NR-U" 3GPP TSG RAN WG1 Meeting #93, R1-1806106, May 25, 2018, Busan, Korea (8 pages).
Second Office Action for CN Appl. No. 201880095800.2, dated Jan. 18, 2023.
Second Office Action on KR Appl. No. 10-2021-7005087, dated Jun. 28, 2023 (with English translation, 7 pages).
Third Office Action for CN Appl. No. 201880095800.2, dated Jul. 19, 2023 (with English translation, 13 pages).

SYSTEMS AND METHODS FOR CHANNEL ACCESS

CROSS-REFERENCE TO RELATED APPLICATIONS

This application is a continuation of U.S. application Ser. No. 17/149,500, filed on Jan. 14, 2021, which claims the benefit of priority under 35 U.S.C. § 120 as a continuation of PCT Patent Application No. PCT/CN2018/096394, filed on Jul. 20, 2018, the disclosures of which are incorporated herein by reference in their entireties.

TECHNICAL FIELD

This disclosure relates generally to wireless communications and, more particularly, to systems and methods for channel access in licensed and unlicensed spectrums.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today.

Within a licensed spectrum, a base station (BS) may configure a physical downlink control channel (PDCCH) detection pattern to enable a user device (UE) to detect the PDCCH in the time domain. The PDCCH detection pattern may include information, such as a PDCCH detection period, a detection offset, and a relationship between a detection pattern and a time slot. The BS may send the PDCCH in accordance with the PDCCH detection pattern so that the UE may detect the PDCCH in accordance with the PDCCH detection pattern.

However, in an unlicensed spectrum, use of a PDCCH detection pattern for PDCCH detection is likely to be unsuccessful due to the use of traditional listen before talk (LBT) protocols by devices in the unlicensed spectrum. Accordingly, it may be difficult for a UE to detect a PDCCH of a BS in the unlicensed spectrum. Also, time domain resources accorded to a PDCCH transmission interval may be reduced compared to when traditional LBT protocols are not utilized. Furthermore, when the PDCCH transmission interval is increased, the PDCCH transmission opportunity will be decreased for a same period of time. However, reduction of a PDCCH transmission interval and increase in the PDCCH transmission may also increase power consumption at a UE configured to detect the PDCCH. Accordingly, traditional techniques for detecting PDCCH for a UE in the unlicensed spectrum may not be entirely satisfactory.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a communication node, includes: detection of an idle channel associated with a communication device after performance of a channel access procedure; transmitting an initial signal after the detection of the idle channel, wherein the initial signal configures a communication device to start detecting a control channel; and transmitting a control signal using the control channel to the communication device after the transmitting the initial signal.

In a further embodiment, a method performed by a communication device includes: detecting an initial signal from a communication node on an idle channel, wherein the initial signal configures the communication device to start detecting a control channel; and detecting a control signal on the control channel from the communication node in accordance with the initial signal.

BRIEF DESCRIPTION OF THE DRAWINGS

Various example embodiments of the invention are described in detail below with reference to the following Figures. The drawings are provided for purposes of illustration only and merely depict example embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXAMPLE EMBODIMENTS

Various example embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

Figure 1:
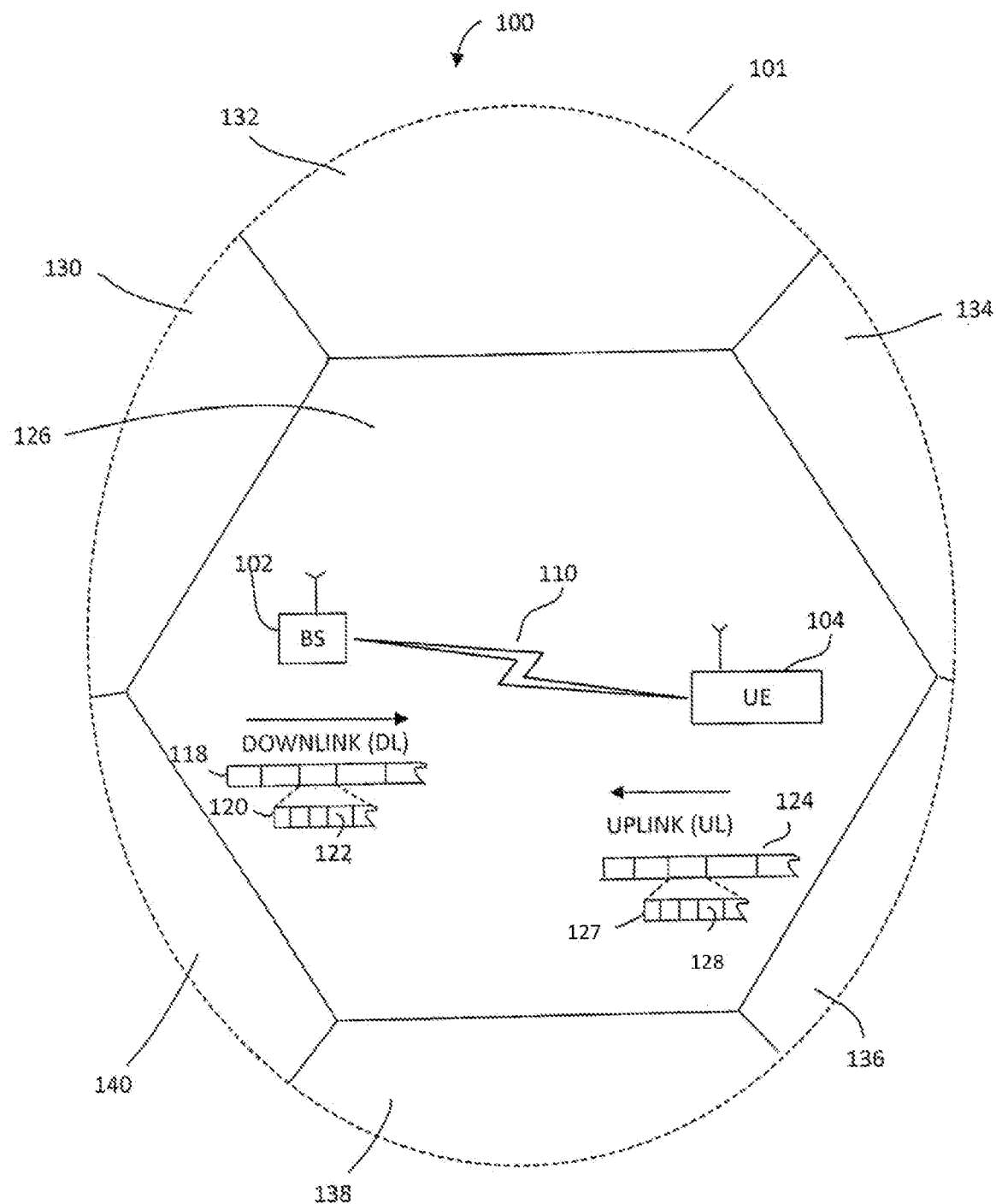
FIG. 1 illustrates an example cellular communication network in which techniques disclosed herein may be implemented, in accordance with an embodiment of the present disclosure.

FIG. 1 illustrates an example wireless communication network 100 in which techniques disclosed herein may be implemented, in accordance with an embodiment of the present disclosure. Such an example network 100 includes a base station 102 (hereinafter "BS 102") and a user equipment device 104 (hereinafter "UE 104") that can communicate with each other via a communication link 110 (e.g., a wireless communication channel), and a cluster of notional cells 126, 130, 132, 134, 136, 138 and 140 overlaying a geographical area 101. A UE 104 may undergo a random access procedure to join the network 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users. Accordingly, reference to a cell may be a shorthand reference to a BS with an associated coverage region or area. In certain embodiments, a cell may be interchangeably referred to as a BS and be referred to as "a cell or a BS", or "a BS or a cell.

For example, the BS 102 may operate at an allocated channel transmission bandwidth (e.g., spectrum) to provide adequate coverage to the UE 104. The spectrum may be regulated to define a licensed range and/or an unlicensed range. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the invention. In certain embodiments, a communication device may refer more specifically to a UE and a communication node may refer more specifically to a BS in relation to the UE.

Figure 2:
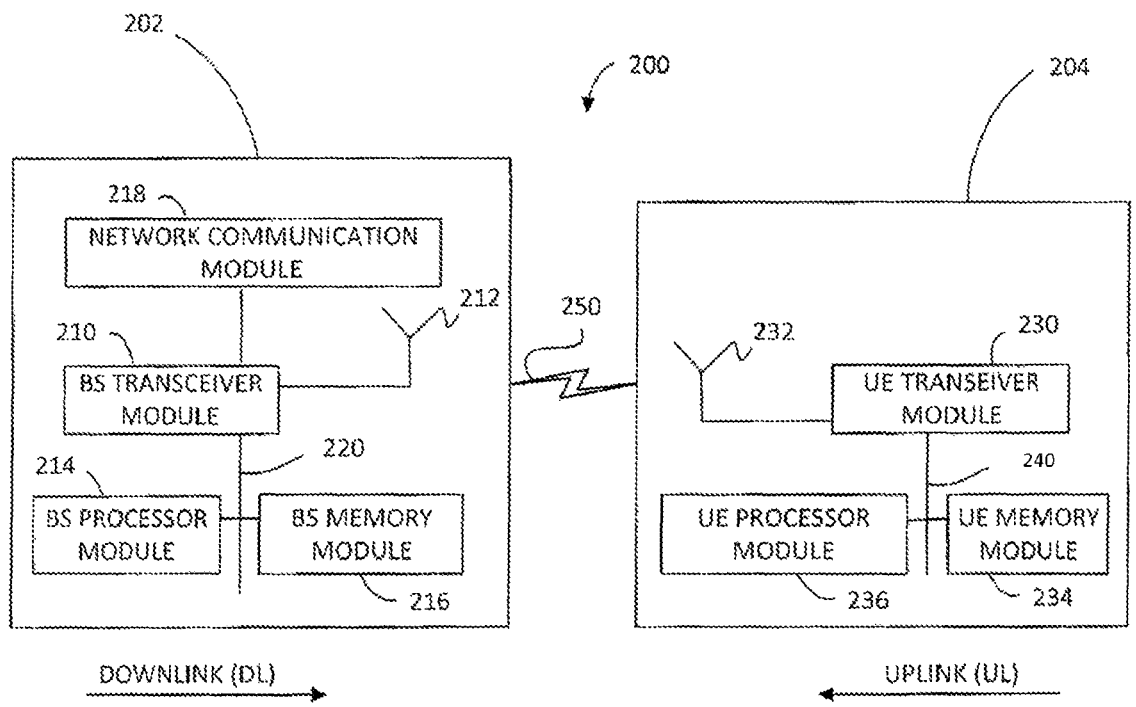
FIG. 2 illustrates block diagrams of an example base station (BS) and a user equipment (UE) device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the invention. The system 200 may include components and elements configured to support known or conventional operating features that need not be described in detail herein. In one example embodiment, system 200 can be used to transmit and receive data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver module 230 may be referred to herein as an "uplink" transceiver module 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver module 210 may be referred to herein as a "downlink" transceiver module 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceiver modules 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver module 230 and the BS transceiver module 210 are configured to communicate via the wireless data communication link 250, and cooperate with a suitably configured RF antenna arrangement 212/232 that can support a particular wireless communication protocol and modulation scheme. In some example embodiments, the UE transceiver module 210 and the BS transceiver module 210 are configured to support industry standards such as the Long Term Evolution (LTE) and emerging 5G standards, and the like. It is understood, however, that the invention is not necessarily limited in application to a particular standard and associated protocols. Rather, the UE transceiver module 230 and the BS transceiver module 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage and/or computer-readable medium known in the art. In this regard, memory modules 216 and 234 may be coupled to the transceiver modules 210 and 230, respectively, such that the transceiver modules 210 and 230 can read information from, and write information to, memory modules 216 and 234, respectively. The memory modules 216 and 234 may also be integrated into their respective transceiver modules 210 and 230. In some embodiments, the memory modules 216 and 234 may each include a cache memory for storing temporary variables or other intermediate information during execution of instructions to be executed by transceiver modules 210 and 230, respectively. Memory modules 216 and 234 may also each include non-volatile memory for storing instructions to be executed by the transceiver modules 210 and 230, respectively.

The network communication module 218 generally represents the hardware, software, firmware, processing logic, and/or other components of the base station 202 that enable bi-directional communication between the BS transceiver module 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that the BS transceiver module 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically or virtually constructed, programmed, formatted and/or arranged to perform the specified operation or function.

Systems and methods in accordance with various embodiments include an initial signal that precedes and characterizes an associated control channel. The initial signal may be sent from a BS to a UE to transition a UE from a non-engaged state (e.g., where the UE is not transmitting on a particular channel or resource) to an engaged state (e.g., where the UE is configured to transmit on the particular channel or resource). Stated another way, a BS may send an initial signal if a channel is idle after performance of a channel access procedure (CAP) to initiate communicates with a UE. A channel may refer to a particular resource or set of resources on which communication is made, such as a carrier, a frequency, a partial bandwidth, or a sub band. A channel may differ from a control channel, which refers to a collection of control signals that address different Open System Interconnection (OSI) layers. In certain embodiments, the initial signal may also be referred to as a wake up signal.

Advantageously, as will be discussed further below, the transmission of the control channel and initial signal may reduce UE power consumption when compared to traditional systems that do not practice the various embodiments disclosed herein. Also, the manner of initial signal and/or control signal transmissions using the control channel is not limited to transmissions in the unlicensed spectrum, and can be applied to the licensed spectrum as well.

In first example embodiments, an initial signal and control channel may be transmitted and received in accordance with a predetermined pattern. The predetermined pattern may indicate how the initial signal is to be transmitted and/or detected. Also, the initial signal may indicate how the control channel is to be transmitted and/or detected. In certain embodiments, the predetermined pattern may be predetermined, produced, or configured by a BS.

Figure 3:
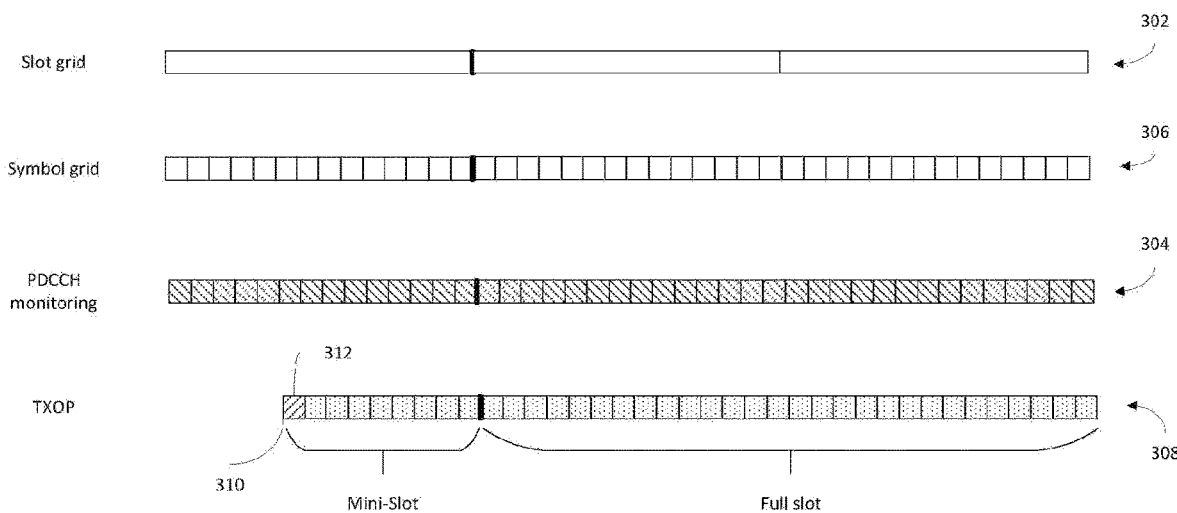
FIG. 3 illustrates a deployment of a slot grid with a single detection pattern, in accordance with some embodiments of the present disclosure.

FIG. 3 illustrates a deployment of a slot grid 302 with a single detection pattern 304, in accordance with some embodiments of the present disclosure. The slot grid 302 is broken down into a symbol grid 306, for which a predetermined detection pattern 304 and a transmission pattern 308 may be mapped. In the illustrated embodiment, the detection pattern 304 may be a PDCCH detection pattern (e.g., referred to in shorthand as PDCCH monitoring), but may be a detection pattern for other types of control channels in other embodiments. Also, the transmission pattern 308 (e.g., referred to in shorthand as a transmission opportunity (TXOP)) may be transmitted at a point after successful channel access 310. For example, with reference to the symbols starting at the far left of the symbol grid 306, successful channel access may be indicated at the fifth symbol so that the initial signal 312 is sent at a sixth symbol (e.g., where the initial signal 312 is at the sixth symbol). After the initial signal 312, a control channel may be sent from the seventh symbol onward. Also, in certain embodiments, the initial signal 312 and subsequent control channel may not initiate at the beginning of a full slot and may occupy a mini slot due to part of the full slot being occupied by time domain resources used for gaining successful channel access. A mini slot may be a portion of a full slot.

Accordingly, in certain embodiments, a BS sends an initial signal immediately after occupying a channel. Alternatively, the BS transmits the initial signal on a first complete symbol, or the first few complete symbols, or the pre-defined symbols in a slot or subframe after occupying a channel.

From the perspective of a UE, the initial signal may be detected on a non-occupied channel, or on a predefined symbol of a non-occupied time domain resource (e.g., period), or before receiving data transmitted by a BS, or before an indication of channel occupancy that is not the initial signal. Detection of an initial signal indicates to the UE that the BS has occupied the channel and is about to transmit data to the UE. In response to receiving the initial signal, the UE may configure itself to receive the subsequent transmissions (e.g., transmissions of data after the initial signal) by, for example, transitioning from a non-engaged state. As noted above, a non-engage state may describe where the UE was not engaged with (e.g., not utilizing) a particular channel, that the BS has achieved successful channel access at, for communication with a BS. This is in contrast with an engaged state that utilizes that particular channel, that the BS has achieved successful channel access at, for communication with the BS.

In certain embodiments, the UE detects a control signal as part of a control channel (e.g., a PDCCH) after the initial signal. Accordingly, if the UE does not detect an initial signal, the UE will also not detect the subsequent control signal as part of a control channel after the initial signal. In particular embodiments, a PDCCH pattern, also referred to as a PDCCH occasion, may include a predetermined set of parameters, such as a detection period, detection offset, or other indication of a detection pattern for a single or multiple slots. Also, the combination of the initial signal and a PDCCH may be continuous or discontinuous in the time domain. Stated another way, a PDCCH may or may not immediately follow an initial signal in the time domain. Although the PDCCH has been indicated as a specific example of a control channel, other control channels may be utilized as desired in different applications across various embodiments. For example, a control-resource set (CORE-SET), or a search space (e.g., a search space for one or more UE's) may be examples of other types of control channels.

In a particular embodiment, the process of detecting a PDCCH may begin by first having a BS select a PDCCH detection pattern 304. The particular PDCCH detection pattern 304 may be selected, for example, by an index value or other indicator included in an initial signal. As noted above, in an unoccupied slot or other time domain resource, a UE may not be able to detect a PDCCH if the UE does not know which PDCCH detection pattern to utilize for PDCCH detection.

Then, the BS sends the initial signal to the UE. Stated another way the UE may receive the initial signal after successful channel access by the BS. Successful channel access may be noted by the BS when the BS performs a channel access procedure at a channel and subsequently detects that the channel is idle.

After initial signal transmission, the BS may then transmit control signals as part of the control channel to the UE and the UE may receive the control channel signal. As noted above, the UE may detect the PDCCH after the UE detects the initial signal (e.g., in the mini slot indicated in the transmission pattern 308). The PDCCH may be detected in accordance with the PDCCH detection pattern indicated in the initial signal (e.g., indicated by a parameter or information included within the initial signal). In certain embodiments, the PDCCH may be detected immediately after the initial signal without regard to whether the PDCCH is sent with a full slot or not. In other embodiments, the PDCCH is detected only with a full slot and thus may be detected as part of the next full slot after detection of the initial signal.

Figure 4:
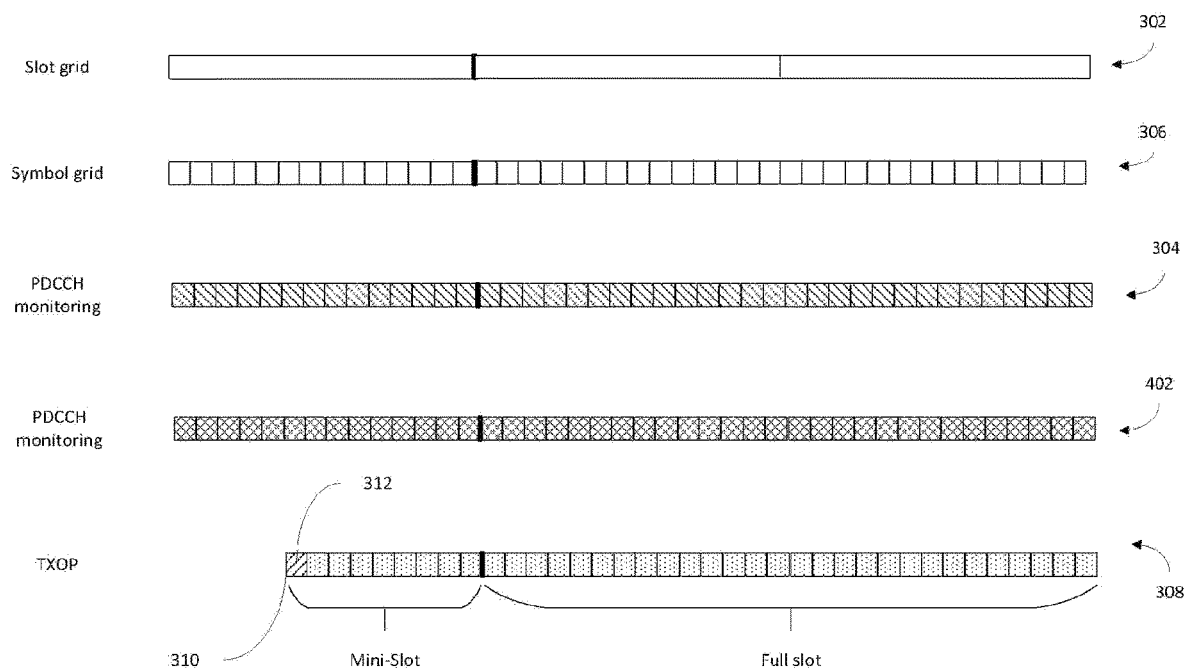
FIG. 4 illustrates a deployment of a slot grid with two detection patterns, in accordance with some embodiments of the present disclosure.

FIG. 4 illustrates a deployment of the slot grid 302 with two detection patterns 304, 402, in accordance with some embodiments of the present disclosure. As noted above similar to FIG. 3, in FIG. 4 the slot grid 302 is broken down into the symbol grid 306, for which two predetermined detection patterns 304, 402 and the transmission pattern 308 may be mapped. In the illustrated embodiment, the detection patterns 304, 402 may be PDCCH detection patterns (e.g., referred to in shorthand as PDCCH monitoring), but may be a detection pattern for other types of control channels in other embodiments.

In certain embodiments, the process of detecting a PDCCH may begin by first having a BS select a first PDCCH detection pattern 304 and a second PDCCH detection pattern 402. The BS may configure the first PDCCH detection pattern to be applied to a mini-slot that immediately follows an initial signal and from which an occupation period on which the BS camps on the channel may start. The occupation period may refer to an amount of time domain resource (e.g., a period of time) at which a BS may occupy and exclusively utilize a channel. The second PDCCH detection pattern may be applied to a full slot. Also, the UE does not detect any control channel in the unoccupied period prior to receipt of an initial signal 312 when the BS is performing the channel access procedure. This is due to the UE first detecting the initial signal before detecting a control channel, as discussed above.

Then, the BS sends the initial signal 312 to the UE, and the UE may receive the initial signal 312. The initial signal 312 may be sent and/or received after successful channel access. Successful channel access may be noted by the BS when the BS performs a channel access procedure at a channel and subsequently detects that the channel is idle. The UE may detect the initial signal 312 in the mini slot that shares the full slot with the occupation period at which the BS achieved channel access. The initial signal 312 may configure the UE to detect the PDCCH in accordance with the first PDCCH detection pattern 304 in the mini-slot and to detect the PDCCH in accordance with the second PDCCH detection pattern 402 in the full slot. Thus, after detecting and decoding the initial signal, the UE may detect the PDCCH in accordance with the first PDCCH detection pattern 304 in the mini-slot and to detect the PDCCH in accordance with the second PDCCH detection pattern 402 in the full slot.

In certain embodiments, a control channel may be a PDCCH or a CORESET of a common search space. In such embodiments, there may be two options. As a first option, after a UE occupies a channel, an initial signal may be sent at a particular time before the PDCCH or CORESET is transmitted. However, the UE may still detect the control channel (e.g., a PDCCH or CORESET) even if the UE does not detect the initial signal sent at the particular time. This may be due to the UE previously receiving the initial signal at a time prior to the particular time and thus already being configured to receive the subsequent control channel.

As a second option, after the UE occupies a channel, the initial signal is sent at a particular time before the PDCCH or CORESET is sent. If the UE does not detect the initial signal sent at the particular time, then the UE will not also detect the PDCCH or CORESET. This may be due to the initial signal at the particular time being the only initial signal capable of configuring the UE to detect the PDCCH or CORESET.

The first and second options may be applied to different types of control channels. For example, a first type of control channel may operate under the first option and a second type of control channel may operation under the second option. Examples of types of control channels of a common search space may include, for example, Type0-PDCCH, Type0A-PDCCH, Type1-PDCCH, Type2-PDCCH, and a Type3-PDCCH. Each of these types of PDCCHs are conventional and will not be discussed in detail herein.

In various embodiments, after a BS occupies a channel, the BS may transmit an initial signal in accordance with a predetermined initial signal pattern. This predetermined initial signal pattern may be utilized for transmission and/or detection. Accordingly, the UE may detect the initial signal in accordance with the predetermined initial signal pattern (e.g., as an initial signal detection pattern). In specific embodiments, a BS may transmit the initial signal immediately after occupying a channel, such as with an earliest possible position after occupying a channel.

In certain embodiments, an initial signal is processed only once within an occupation period such that a UE does not process subsequent initial signals after the processing of a first initial signal within an occupation period. For example, an initial signal may be transmitted at symbol 0, symbol 14, symbol 28, symbol 42, and so on of a slot in a particular initial signal pattern. If the UE detects an initial signal at symbol 14, then the initial signal need not be detected at a subsequent symbol to process a subsequent control channel (e.g., the initial signal need not be detected at symbol 28, 42, and so on).

Certain embodiments may include one of two example techniques for detection of an initial signal and/or a PDCCH. In a first example technique, there may only be a single initial signal and PDCCH pattern (e.g., a single initial signal and PDCCH detection pattern). Stated another way, a single detection pattern may be utilized to detect both an initial signal and a PDCCH. Stated yet another way, only one transmission configuration or detection configuration of the initial signal is configured, and only one PDCCH monitoring occasion detection pattern is configured.

In a second example technique, different detection patterns may be utilized to detect an initial signal and a PDCCH. For example, the detection pattern for an initial signal may be different from the detection pattern for a PDCCH. These detection patterns may differ, for example, by an offset of a predetermined amount or by a shift of one of more symbols.

Also, in particular embodiments, a PDCCH may be detected in accordance with information included in an initial signal within a mini slot while the PDCCH may be detected in accordance with a predetermined PDCCH detection pattern not indicated in the initial signal in a full slot.

Certain embodiments include two example techniques for detection of a PDCCH or CORESET in a common search space. In a first example technique, a UE may not need to detect an initial signal in order to detect the PDCCH or CORESET. In a second example technique, a UE may need to detect the initial signal in order to detect the PDCCH or CORESET.

The above referenced example techniques may be applied to different types of control channels. For example, a first type of control channel may operate under one example technique and a second type of control channel may operation under the a different example technique. Examples of types of control channels of a common search space may include, for example, Type0-PDCCH, Type0A-PDCCH, Type1-PDCCH, Type2-PDCCH, and a Type3-PDCCH. Each of these types of PDCCHs are conventional and will not be discussed in detail herein.

In various embodiments, a BS may choose a pattern for an initial signal and/or a control channel and transmit the pattern to the UE via the primary system information most important bit (MIB), the remaining minimum system information (RMSI), other system information in the open systems interconnection (OSI) model, radio resource control (RRC) signaling, medium access control (MAC) control element (CE) or downlink control signaling or downlink control information (DCI).

An initial signal may indicate at least one of the following parameters associated with a control channel: a transmission period or a detection period, a transmission offset or a detection offset, a transmission pattern or a detection pattern in one time slot or a subframe, and a duration of a control channel. Among these parameters, the units of certain parameters may be time slots or subframes. Also, the choice of a pattern (e.g., a transmission pattern or detection pattern) may be indicated by a bitmap or a predefined manner between a BS and UE.

As noted above, after a BS occupies a channel, the BS may send an initial signal on one or more symbols before sending a control channel (e.g., a collection of control signals via a control channel). The UE may then detect the initial signal on or more symbols before detecting the control channel. The symbols in an initial signal and/or a control channel may be continuous or discontinuous in the time domain. For example, symbols of the initial signal and the control channel may be immediately adjacent each other, or may be spaced apart from each other.

In various embodiments, one or more symbols in the patterns may be predetermined (e.g., by standardizing an initial signal pattern between a UE and BS), or configurable by the BS through system information, RRC signaling, or DCI signaling to a UE. For example, an offset may be defined between the initial signal and a control channel. This offset may indicate that the initial signal does not immediately precede the control channel, such that the initial signal and control channel may be shifted by a number of symbols/slots or subframes from each other. Examples of parameters that may define a control channel pattern for detection by a UE may include, for example, a detection period (e.g., a period of time to perform detection of a control channel), detection offset (e.g., an offset between detection patterns for an initial signal and a control channel), and detection pattern in one slot (e.g., a characterization of a detection pattern among the symbols of a full slot or mini slot).

In certain embodiment, an initial signal is sent by a BS on a symbol immediately following channel occupancy, as opposed to delaying the transmission of the initial signal following channel occupancy. In various embodiments, the initial signal is only processed once by a UE within an occupation period. For example, an initial signal detected at a subsequent time after a previous time in an occupation period is not processed by a UE that has already processed the initial signal at the previous time in the occupation period.

In particular embodiments, an occupation period is defined by regulation in an unlicensed spectrum. The occupation period may characterize an amount of time that a BS may occupy and utilize a channel for communications. As noted above, discovering a channel to be idle after performance of a channel access procedure may initiate the occupation period. However, the occupation period may also be defined by a finite amount of time from the initiation of the occupation period so that other devices may also occupy the channel. For example, an occupation period may be shorter than a maximum channel occupation time (MCOT) parameter. Also, as noted above, transmitting an initial signal after channel occupation in the unlicensed spectrum by a BS configures a recipient UE to utilize the occupied channel. More specifically, the UE is informed that it may utilize the occupied channel for communications with the BS. Also, in virtue of the initial signal, the UE is further provided with information that enables the UE to properly detect a subsequent control channel (e.g., the constituent control signals of the subsequent control channel) to facilitate subsequent data communications. In contrast, without the initial signal, the UE would not be informed as to when the UE may communicate with a BS in an unlicensed spectrum as such communications may not be standardized or regulated in the unlicensed spectrum.

After a UE detects an initial signal, it may then detect a control channel (e.g., a PDCCH) that follows the initial signal and that is characterized by the initial signal. Thus, in certain embodiments, if a UE does not detect an initial signal, the UE will also not detect a control channel associated with the initial signal. For example, for a PDCCH or CORSET of a UE specific search space, if a UE does not detect an initial signal of the UE specific search space, the UE will also not detect a control channel associated with the initial signal of the UE specific search space.

In particular embodiments, transmission and/or detection of an initial signal may be performed in accordance with a detection pattern of a PDCCH occasion. Stated another way, a PDCCH occasion may also describe an initial signal such that the PDCCH occasion may be indicative of transmission or detection of the initial signal in the time domain. Accordingly, a control channel occasion (e.g., a PDCCH occasion) may include a pattern, for detection and transmission, of both a control channel and an initial signal.

In certain embodiments, a control channel may be a PDCCH or a CORESET of a common search space. In such embodiments, there may be two example options. As a first example option, after a UE occupies a channel, an initial signal may be sent at a first time before the PDCCH or CORESET is transmitted. However, the UE may still detect the control channel (e.g., a PDCCH or CORESET) even if the UE does not detect the initial signal sent at the first time. This may be due to the UE previously receiving the initial signal at a time prior to the first time and thus already being configured to receive the subsequent control channel (e.g., the PDCCH or CORESET).

As a second example option, after the UE occupies a channel, the initial signal is sent at a first time before the PDCCH or CORESET is sent. If the UE does not detect the initial signal sent at the first time, then the UE will not also detect the PDCCH or CORESET. This may be due to the initial signal at the first time being the only initial signal capable of configuring the UE to detect the subsequent control channel (e.g., the PDCCH or CORESET).

The first and second example options may be applied to different types of control channels. For example, a first type of control channel may operate under the first example option and a second type of control channel may operate under the second example option. Examples of types of control channels of a common search space may include, for example, Type0-PDCCH, Type0A-PDCCH, Type1-PDCCH, Type2-PDCCH, and a Type3-PDCCH. Each of these types of PDCCHs are conventional and will not be discussed in detail herein.

Accordingly, a control channel occasion (e.g., a PDCCH occasion) may include a pattern, for detection and transmission, of both a control channel and an initial signal. In other embodiments, an initial signal is defined by an initial signal pattern (e.g., for transmission and/or detection) that is different than a control channel pattern.

In a second example embodiment, an initial signal and/or control channel may be transmitted and/or received by beamforming. Stated another way, in order to achieve beamforming gain and ensure coverage of the initial signal, an initial signal is transmitted according to beam sweeping after a BS occupies a channel.

For example, an arbitrary number "n" initial signals are transmitted on respective beams within a round of beam scanning as follows: At time t0, an initial signal is transmitted on beam 0; At time t1, an initial signal is transmitted on beam 1; then at the time t(n−1), the initial signal is transmitted on beam n−1. The time t0 to t(n−1) may be distributed in the same time slot or in multiple consecutive time slots. The time t0 to t(n−1) may be continuous or discontinuous in the entirety of, or part of, the time domain. Stated another way, n initial signals may be distributed in the same time slot, or in multiple consecutive time slots. The n initial signals may be continuous or discontinuous in the entirety of, or only part of, the time domain.

Among different beams, each of the n initial signals may be the same or may be different. For example, different initial signals transmitted in different beams may include different index values that reference particular parameters that characterize a control channel. As a more specific example, a set of n initial signals may be transmitted at time t0, t1, . . . (n−1). In a first embodiment, among the set of n initial signals, a generated sequence, scrambling sequence, sequence number, and carried information may be the same. However, in a second embodiment, these initial signals may the same type of signal (e.g., demodulated reference signal (DMRS), or channel state information-reference signal (CSI-RS), or phase tracking reference number (PTRN), a primary synchronization signal (PSS), or a secondary synchronization signal (SSS)) but with different signal numbers and scrambling sequences.

In various embodiments, after occupying a channel, a BS may transmit an initial signal on a predetermined beam, or a beam selected by the BS. The selected beam may be a single beam or multiple beams. The beam may be selected according to the association between a random access channel (RACH) occasion and synchronization signal block (SSB) as sent by a UE. The beam may also, or alternatively be, selected according to an uplink signal sent by the UE, such as a sounding reference signal (SRS) measurement result. The beam may also, or alternatively be, selected according to the reciprocity and correlation of the uplink and downlink beams. For example, the beam selected for transmission by a BS may be beam 2 (or any other arbitrarily selected beam). The BS may then send an initial signal on beam 2.

In particular embodiments, the association between the initial signal and the selected beam may be one of three following example scenarios. In a first example scenario, there may be no correlation between the initial signal and the selected beam. Stated another way, even though a particular beam is selected, the initial signal itself is not changed based on the beam. The beam is only utilized as a manner of communicating the initial signal. The signal type, generation sequence, scrambling sequence, sequence number, or carried information is the same irrespective of the selected beam. The first example scenario may be performed in a beam sweeping mode in certain embodiments.

In a second example scenario, there may be an association between the initial signal and the selected beam. For example, assuming that the beam selected by the BS is beam 1 or beam 2, the initial signal transmitted by beam 1 may be initial signal 1, and the initial signal transmitted on beam 2 may be initial signal 2. Each initial signal may have different signal numbers and scrambling sequences. However, each initial signal sequence number is associated with a corresponding beam sequence number. Stated more specifically, there may be an order associated with the transmission of the initial signals that correspond with the order at which the beams are transmitted. Otherwise, the initial signal on the two beams may have the same signal type (e.g., DMRS, or CSI-RS, or PSS/SSS). Accordingly, the UE may deduce the specific beam used for transmission based on the received initial signal.

In a third example scenario, there may be an association between an initial signal and an SS/physical broadcast channel (PBCH) block associated with a particular beam. For example, the initial signal 0 may be associated with SS/PBCH block 0, initial signal 1 may be associated with SS/PBCH block 1, and so on. Also, a BS may transmit the SS/PBCH block through beam sweeping. Thus, the UE may select the SS/PBCH block 1 after performing measurements on the UE's received signals. Then, the UE may transmit a RACH occasion associated with SS/PBCH block 1 to the BS. The BS thus receives feedback for beamforming applications based on the BS's understanding of associations between SS/PBCH blocks and particular beams.

In a third example embodiment, an initial signal may overlap in the time domain with a SS/PBCH block, CORESET/RMSI (e.g., where a CORESET is used for remaining minimum system information (RMSI) demodulation), and/or CSI-RS/PTRS/DMRS/SRS.

In certain embodiments, the BS does not transmit the initial signal if the position of the initial signal overlaps with the SS/PBCH block position, or overlaps with CORESET/RMSI, or overlaps with the position of the RACH occasion. Also, the UE assumes that an initial signal is invalid if the position of the initial signal overlaps with the SS/PBCH block position, or overlaps with CORESET/RMSI, or overlaps with the position of the RACH occasion. Stated another way, UE will only process the SS/PBCH block, or CORESET/RMSI when the position of the initial signal overlaps with the SS/PBCH block, or CORESET/RMSI. In certain embodiments, a BS will not transmit an initial signal if the location of the initial signal in the time domain overlaps with the location of a CSI-RS, phase tracking reference signal (PTRS), DMRS, or SRS.

In further embodiments, a BS will not transmit a CSI-RS, PTRS, DMRS, or SRS if the location of the initial signal overlaps with the location of the CSI-RS, PTRS, DMRS, or SRS. In yet further embodiments, a UE will not process a CSI-RS, PTRS, DMRS, or SRS if the location of the initial signal overlaps with the location of the CSI-RS, PTRS, DMRS, or SRS.

In a fourth example embodiment, an initial signal may include at least one of the following signals: a PSS, SSS, DMRS, CSI-RS, PTRS, or SRS. In certain embodiments, the DMRS refers to a DMRS for PBCH or PDCCH or physical uplink control channel (PUCCH) demodulation.

In a fifth example embodiment, an initial signal may include information (e.g., provide information to the UE) such as at least one of: a cell identifier (ID), a UE group ID, system frame number (SFN) information, a timing relationship, subcarrier spacing (SCS), an initial signal number associated with a SS/PBCH block number index, information on the type of PDCCH detection pattern, and information of whether the BS initial signal is the sender or the receiver of subsequent data.

The timing relationship in the fifth example embodiment may refer to a timing relationship between the initial signal and a control channel (e.g., a PDCCH) in terms of subframes, time slots, or symbols, subcarrier spacing.

A SCS may be configured in system information or RRC signaling. In one example, a SCS (e.g., 15 kHz), may define a mini-slot and not a full slot in the initial stage of occupancy. Therefore, by using a higher SCS (e.g., 30 kHz) in a mini-slot, it may be possible to obtain a shorter full time slot in the time domain to improve spectral efficiency. The SCS in an initial signal may refer to an SCS adopted at the beginning or end of an occupation period and be generally higher than the SCS configured by system information or RRC signaling. In certain embodiments, an SCS may be indicated as an index value in a field of an initial signal and/or may be carried by the scrambling code sequence or the generation sequence of the initial signal.

An initial signal number associated with a SS/PBCH block number index may be utilized in beam forming applications, as discussed further above. For example, the initial signal 0 may be associated with SS/PBCH block 0, initial signal 1 may be associated with SS/PBCH block 1, and so on. Also, a BS may transmit the SS/PBCH block through beam sweeping. Thus, the UE may select the SS/PBCH block 1 after performing measurements on the UE's received signals and transmits a RACH occasion associated with SS/PBCH block 1 to the BS. The BS thus receives feedback for beamforming applications based on the BS's understanding of associations between SS/PBCH blocks and particular beams.

The information on the type of PDCCH detection pattern may refer to, for example, a particular PDCCH detection pattern as selected and/or configured by a BS. For example, as discussed above, a BS may configure two PDCCH detection patterns. The UE may detect a PDCCH using one of the detection patterns by default. However, after receiving an initial signal, the UE may detect a PDCCH using a selected detection pattern as instructed by the initial signal.

As noted above, in certain embodiments an initial signal may carry information on whether the BS transmitting the initial signal is the sender or the receiver of subsequent data. This information may be carried by a scrambling code sequence or other sequence indicated by the initial signal. For example, the BS may schedule the UE to transmit an uplink data channel (e.g., a physical uplink shared channel (PUSCH)) to the BS that transmitted the initial signal. Accordingly, the initial signal may carry information that indicates that the BS that transmits the initial signal is also the receiver of the PUSCH. This may alleviate contention among neighboring devices (e.g., a neighboring BS or UE) over use of the channel. Accordingly, the neighboring device may choose to contend or avoid using the channel. This indication may be performed by associating such an indication with a predetermined index value.

In certain embodiments, a BS sends an initial signal immediately after occupying the channel. In further embodiments, the BS sends the initial signal on the first complete symbol, or the first few complete symbols, or on predefined symbols in a slot/subframe after occupying the channel. Also, at a UE, the initial signal is detected on a non-occupied period, or on a predefined symbol of the non-occupied period, or before receiving data transmitted by the BS, or before confirming that the BS has occupied the channel.

In particular embodiments, after a BS occupies the channel, the BS transmits an initial signal according to a predetermined initial signal pattern (e.g., predetermined initial signal transmission pattern or detection pattern). The UE may detect an initial signal on a predetermined resource according to a predetermined detection pattern for the initial signal.

In various embodiments, after a BS occupies a channel, the BS sends an initial signal on one or more symbols before sending a PDCCH (e.g., a PDCCH that may be detected in accordance with a PDCCH detection pattern). The UE may detect the initial signal on one or more symbols before the PDCCH.

In a number of embodiments, an initial signal is sent on a beam. For example, after a BS occupies a channel, the initial signal may be sent via beam sweeping. Stated another way, an arbitrary number "n" initial signals are transmitted on respective beams within a round of beam scanning). As another example, after occupying a channel, a BS may transmit an initial signal on a predetermined beam selected by the BS.

In certain embodiments, if the position of the initial signal overlaps with the SS/PBCH block position, or overlaps with CORESET/RMSI (where CORESET is used for RMSI demodulation), or overlaps with the position of the RACH occasion, the BS does not send an initial signal and the UE does not receive or process the initial signal. Accordingly, the BS may transmit, and the UE may receive, an SS/PBCH block, or CORESET/RMSI only without the overlapping (e.g., colliding) initial signal.

However, in other embodiments, if the position of the initial signal overlaps with the position of the CSI-RS, PTRS, DMRS, and/or SRS, then the BS only sends the initial signal and does not send the overlapping CSI-RS, PTRS, DMRS, or SRS.

In certain embodiments, the initial signal may be at least one of the following signals: PSS, SSS, DMRS, CSI-RS, PTRS, and SRS. The DMRS may refer to a DMRS for PBCH or PDCCH or PUCCH demodulation.

In various embodiments, an initial signal may include at least one of: a cell ID, a UE group ID, system frame number (SFN) information, a timing relationship, subcarrier spacing (SCS), an initial signal number associated with a SS/PBCH block number index, information on the type of PDCCH detection pattern, and information of whether the BS initial signal is the sender or the receiver of subsequent data.

In certain embodiments, a BS may configure a single control channel detection pattern that is indicated to a UE in an initial signal. In further embodiments, the BS may configure multiple control channel detection patterns and choose of among the multiple control channel detection patterns. The chosen control channel detection pattern(s) may be indicated to the UE in an initial signal. The UE may detect the control channel in accordance with the control channel detection pattern indicated in the initial signal. These control channel detection patterns may be implemented within a full slot or a mini-slot. For example, the control channel detection pattern may be implemented in a mini slot immediately after an initial signal. As an alternate example, the control channel detection pattern may be implemented at the next full slot after the initial signal.

In certain embodiments, an initial signal may be detected and/or transmitted multiple times within an occupation period, but may be processed by the receiving UE only once. For example, after processing an initial signal, the UE needs not process the initial signal again if received within the same occupation period.

In particular embodiments, each transmitted beam may include a different initial signal. Each of the beams, and respective different initial signals, may include different information or be of a different initial signal sequence number.

While various embodiments of the invention have been described above, it should be understood that they have been presented by way of example only, and not by way of limitation. Likewise, the various diagrams may depict an example architectural or configuration, which are provided to enable persons of ordinary skill in the art to understand example features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described example embodiments.

It is also understood that any reference to an element or embodiment herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:

1. A method performed by a communication node, the method comprising:
    configuring two PDCCH detection patterns, wherein one PDCCH detection pattern is used by a communication device by default to detect a PDCCH;
    transmitting an initial signal if a channel is idle after performance of a channel access procedure, wherein the initial signal instructs the communication device to use one PDCCH detection pattern to detect a PDCCH; and
    transmitting a control signal using a control channel corresponding to the PDCCH detection pattern to the communication device after the transmitting the initial signal.

2. The method of claim 1, further comprising:
    transmitting the initial signal at a predefined symbol, of a slot or subframe, after the detection of an idle channel; or
    transmitting the initial signal on a symbol preceding a control channel detection pattern associated with the control channel.

3. The method of claim 1,
    wherein the initial signal is continuous with the control signal in a time domain; or
    wherein the initial signal is discontinuous with the control signal in a time domain; or
    wherein the initial signal is part of a set of initial signals and wherein the method further comprises transmitting the set of initial signals on respective beams within a round of beam scanning, wherein preferably each individual initial signal of the set of initial signals comprises different information.

4. The method of claim 1, further comprising:
    indicating a pattern to the communication device; and
    transmitting the initial signal according to the pattern after the detection of an idle channel.

5. The method of claim 1, wherein the method further comprises:
    transmitting the initial signal on a predetermined beam.

6. The method of claim 1, wherein:
    the initial signal and the control channel are transmitted in an unlicensed spectrum.

7. The method of claim 1, wherein the initial signal is at least one of:
    a primary synchronization signal (PSS),
    a secondary synchronization signal (SSS),
    a demodulation reference signal (DMRS),
    a channel state information-reference signal (CSI-RS),
    a phase tracking reference signal (PTRS), or
    a sounding reference signal (SRS).

8. The method of claim 1, wherein the initial signal is not transmitted when the initial signal overlaps in a time domain and a frequency domain with at least one of:
    a sounding signal (SS),
    a physical broadcast channel (PBCH);
    a control-resource set (CORESET) used for remaining minimum system information (RMSI); or
    a random access channel (RACH) occasion.

9. The method of claim 1, wherein the transmitting the initial signal is performed once per occupation period.

10. A method performed by a communication device, the method comprising:

detecting an initial signal from a communication node, wherein the initial signal instructs the communication device to use a PDCCH detection pattern to detect a PDCCH; and detecting a control signal on a control channel from the communication node in accordance with the PDCCH detection pattern.

11. The method of claim 10, wherein the control channel comprises at least one of:
a physical downlink control channel;
a control-resource set; or
a search space, wherein preferably the search space is in a time and frequency domain.

12. The method of claim 10, further comprising:
detecting the control signal at a first time differently than detecting the control signal at a second time; or
detecting a first control signal at a first time and detecting a second control signal at a second time, wherein the control signal comprises the first control signal and the second control signal.

13. The method of claim 10,
wherein the control channel comprises at least one of a Type0-PDCCH, a Type0A-PDCCH, a Type1-PDCCH, a Type2-PDCCH, or a Type3-PDCCH; or
wherein the initial signal configures the communication device to camp on an identified resource.

14. The method of claim 10,
wherein the initial signal comprises at least one of:
a cell identifier;
a group identifier;
a system frame number identifier;
a timing relationship between the initial signal and the control channel;
a subcarrier spacing;
an initial signal number;
a block number index;
information characterizing a control channel detection pattern; or
information identifying whether the communication node is a sender or receiver of a subsequent communication; or
wherein the initial signal identifies multiple control channel detection patterns for use by the communication device; or
wherein control channel detection patterns are produced by the communication node.

15. A computing device comprising:
at least one processor configured to carry out a method comprising:

configuring two PDCCH detection patterns, wherein one PDCCH detection pattern is used by a communication device by default to detect a PDCCH;

transmitting via a transmitter an initial signal if a channel is idle after performance of a channel access procedure, wherein the initial signal instructs the communication device to use one PDCCH detection pattern to detect a PDCCH; and transmitting via the transmitter a control signal using a control channel corresponding to the PDCCH detection pattern to the communication device after the transmitting the initial signal.

16. The computing device of claim 15, wherein the at least one processor is further configured to:
transmit via the transmitter the initial signal at a predefined symbol, of a slot or subframe, after the detection of an idle channel; or
transmit via the transmitter the initial signal on a symbol preceding a control channel detection pattern associated with the control channel.

17. The computing device of claim 15,
wherein the initial signal is continuous with the control signal in a time domain; or
wherein the initial signal is discontinuous with the control signal in a time domain; or
wherein the initial signal is part of a set of initial signals and wherein the method further comprises transmitting the set of initial signals on respective beams within a round of beam scanning, wherein preferably each individual initial signal of the set of initial signals comprises different information.

18. The computing device of claim 15, wherein the at least one processor is further configured to:
indicate a pattern to the communication device; and
transmit via the transmitter the initial signal according to the pattern after the detection of an idle channel.

19. The computing device of claim 15, wherein the at least one processor is further configured to:
transmit via the transmitter the initial signal on a predetermined beam.

20. The computing device of claim 15, wherein the initial signal is not transmitted when the initial signal overlaps in a time domain and a frequency domain with at least one of:
a sounding signal (SS);
a physical broadcast channel (PBCH);
a control-resource set (CORESET) used for remaining minimum system information (RMSI); or
a random access channel (RACH) occasion.

* * * * *